US006366195B1

(12) United States Patent
Harel et al.

(10) Patent No.: US 6,366,195 B1
(45) Date of Patent: Apr. 2, 2002

(54) POWER CONTROL IN TWO-WAY PAGING SYSTEMS

(75) Inventors: Haim Harel, Palo Alto, CA (US); Anthony J. Weiss, Tel Aviv; Yair Karmi, Rishon Lezion, both of (IL); Ilan Zorman, Palo Alto, CA (US)

(73) Assignee: Wireless Online, Inc., Los Altos, CA (US)

( * ) Notice: Subject to any disclaimer, the term of this patent is extended or adjusted under 35 U.S.C. 154(b) by 0 days.

(21) Appl. No.: 09/041,808

(22) Filed: Mar. 13, 1998

(51) Int. Cl.$^7$ ................................................. H04Q 5/22
(52) U.S. Cl. ...................... 340/7.21; 455/69; 455/522; 455/517; 455/524; 340/7.32
(58) Field of Search ........................ 455/38.3, 69, 522, 455/38.1, 524, 517; 340/7.21, 7.32, 522

(56) References Cited

U.S. PATENT DOCUMENTS

| | | | |
|---|---|---|---|
| 4,882,588 A | | 11/1989 | Renshaw et al. |
| 5,404,569 A | * | 4/1995 | Schwendeman et al. ... 455/13.4 |
| 5,448,751 A | | 9/1995 | Takenka et al. |
| 5,648,784 A | | 7/1997 | Ruiz et al. |
| 5,784,031 A | * | 7/1998 | Weiss et al. ................. 342/373 |
| 5,790,940 A | * | 8/1998 | Laborde et al. ............... 455/69 |
| 5,806,003 A | * | 9/1998 | Jolma et al. ................. 455/522 |
| 5,815,798 A | * | 9/1998 | Bhagalia et al. ........... 455/13.4 |
| 5,857,155 A | * | 1/1999 | Hill et al. .................... 455/456 |
| 5,889,494 A | * | 3/1999 | Reudink et al. ............. 342/373 |
| 5,907,816 A | * | 5/1999 | Newman et al. ............. 455/562 |
| 5,937,333 A | * | 8/1999 | Sexton et al. ................. 455/73 |
| 5,956,621 A | * | 9/1999 | Weiss et al. ................ 455/38.1 |
| 5,966,670 A | * | 10/1999 | Keskitalo et al. ........... 455/562 |
| 5,995,840 A | * | 11/1999 | Dorenbosch et al. ....... 455/447 |
| 6,006,068 A | * | 12/1999 | Elkin et al. ................. 455/31.3 |

OTHER PUBLICATIONS

Balanis, C.A., in: Antenna Theory, Analysis and Design, Harper and Row, Inc., pp. 679–685 and 698–699 (1982).
Mailloux, R.J., in: Phase Array Antenna Handbook, Artech House, Inc., pp. 13–20, 438–445, and 521–524 (1994).
Motorola, Inc. Semiconductor Technical Data, FLEXchip Signal Processor, Publication No. MC68175/D 109 pages (1996).
Motorola, Inc. FLEXstack One Way Software Development Kit, Version 2.0 66 pages (Dec. 13, 1996).
Motorola, Inc. Flexible High Speed Paging Protocol Benchmarking, 16 pages (Apr. 26, 1994).
Motorola, Inc. FLEX Protocol's Operational Capabilities for Local, Regional, Nationwide and Global Roaming—Preliminary, 32 pages (Jul. 18, 1995).
Motorola, Inc., Typical FLEX Pager Blcok Diagram with FLEXstack, 1 page (Mar. 27, 1997) www.mot.com/SPS/DSP/flexchip/.
Texas Instruments TMS320FELX1 Chipset Product Brief, 3 pages (Mar. 27, 1997) www.ti.com/sc/docs/ wireless/page-.htm.
Texas Intruments Press Release, "TI Chip Set Supporting FLEX Messaging Protocol Now Available" 2 pages (Nov. 11, 1996) www.ti.com/sc/docs/news/1996/96070.htm.
Texas Instruments TLV5591 Data Manual for FLEX Decoder, Appendix A and B, 22 pages (Apr. 17, 1996).

* cited by examiner

Primary Examiner—William Trost
Assistant Examiner—Marceau Milord
(74) Attorney, Agent, or Firm—Townsend and Townsend and Crew LLP; Kenneth R. Allen

(57) ABSTRACT

A method and system for controlling the level of subscriber unit transmission power in a two-way paging network. The ability to adjust the transmission power of individual subscriber units saves critical subscriber unit resources while still ensuring that a subscriber unit's transmissions are received at a base station in a paging network system. Transmission power-level control further facilitates eliminating interference among subscriber units that transmit to the same base station.

9 Claims, 4 Drawing Sheets

POWER CONTROL IN TWO-WAY PAGING SYSTEMS

STATEMENT OF RELATED APPLICATIONS

The present application relates to the subject matter of five coassigned applications: VERSATILE ANTENNA ARRAY FOR MULTIPLE PENCIL BEAMS AND EFFICIENT BEAM COMBINATION, application Ser. No. 08/808,347; MULTI-CHANNEL MULTI-BEAM ENCODING SYSTEM, filed on May 22, 1997; METHOD AND APPARATUS FOR ADAPTING OMNIDIRECTIONAL SYNCHRONOUS WIRELESS COMMUNICATIONS PROTOCOL TO SECTORIAL ENVIRONMENTS, filed on May 22, 1997; IMPROVED TWO-WAY PAGING UPLINK INFRASTRUCTURE, filed on Aug. 19, 1997; and CONFLICT RESOLUTION IN A MULTI-BEAM MULTI-SITE PAGING SYSTEM, filed on Nov. 17, 1997. The contents of these co-assigned applications are herein incorporated by reference for all purposes.

BACKGROUND OF THE INVENTION

The present invention relates generally to two-way paging networks and more particularly to subscriber unit transmission power control in two-way paging networks.

Two-way paging systems that allow individual subscriber units (SUs), or pagers, to both receive paging information and transmit responses are becoming more prevalent. An SU may either be mobile, such as with portable pagers, or stationary, such as an SU in a vending machine for status reporting. It will be recognized that the invention has a wide range of applicability; it can also be applied to any type of individual wireless receiver/transmitter used in a two-way pager network. In prior art two-way pager networks, the transmission power used by individual SUs to transmit responses is not controlled. An SU transmits information using a constant power level, regardless of either the physical distance to a base station within the paging network, or the clarity of the inbound signal received at the base station.

Several problems arise in this situation, which can be explained with reference to FIG. 1. FIG. 1 depicts a two-way paging network 100. This network is not represented to be prior art, but relates to paging infrastructure as disclosed in co-assigned applications listed above, which are herein incorporated by reference. Network 100 includes a regional controller 101, a plurality of base stations 105, and a plurality of subscriber units (SUs) 110.

Base station 105 utilizes a multi-beam concept by sending signals to the SUs 110 on outbound beams 115, and receiving signals from SUs 110 on inbound beams 120. Preferably, inbound beams 120 and outbound beams 115 are coincident, but in practice they may be skewed from each other as displayed in FIG. 1. Base station 105 may also utilize an omni-directional antenna, which is also disclosed in the co-assigned applications listed above, and herein incorporated by reference.

On occasion, different SUs will send data at the same frequency at the same time. This gives rise to a possibility that SU transmissions will interfere with one another. Compounding the interference problem is an inability of current two-way pager networks to control or vary the level of SU transmission power.

Other problems arise where SU transmission power levels are uncontrolled. First, when the range, or distance, from the SU to the base station is short, a SU may expend excessive energy in transmitting responses. This negatively effects the efficiency and lifetime of the SU's power source. Second, an SU that transmits at excessive power levels at any distance from the base station may interfere with the transmission of another SU that transmits on the same frequency at the same time. Because of its distance from the base station or due to other transmission propagation conditions, the transmissions from the other SUs may hardly be received at a base station or possibly cancelled out by an SU transmitting at an excessive power level.

What is needed is a two-way paging system that supports the capability of controlling transmission power level of individual subscriber units.

SUMMARY OF THE INVENTION

The present invention provides a method and system for controlling subscriber unit transmission power levels in a two-way paging network. The ability to adjust the power level of individual SUs saves critical power resources yet ensures that the SU's transmissions are received at a base station in a paging network. Power control in a two-way paging network further lessens the possibility of interference among multiple SUs transmitting at the same time.

In accordance with a first aspect of the present invention, a method is provided for receiving at a subscriber unit a communication containing a power control command. In response to the power control command, the subscriber unit adjusts its transmission power.

In accordance with a second aspect of the present invention, a method is provided for controlling subscriber unit transmission power in subscriber unit-initiated communication sessions using ReFLEX protocol standards developed by Motorola Inc. of Schaumburg, Ill.

In accordance with a third aspect of the present invention, a method is provided for controlling subscriber unit transmission power levels in base station-initiated communication sessions using the ReFLEX protocol standard.

In accordance with a fourth aspect of the present invention, a two-way paging network is provided for allowing a SU's transmission power to be controlled. The paging network. includes: a plurality of subscriber units having a receiver and a transmitter, a plurality of base stations for sending and receiving data and for sending to selected subscriber units a power control command, and a regional controller for directing communication between individual subscriber units and individual base stations. Further, selected subscriber units include a power control system for controlling transmission power levels of data signals sent to a selected base station.

In accordance with still a fifth aspect of the present invention, a subscriber units apparatus for use in a two-way paging network includes: a receiver, a transmitter, and a power level controller. The power level controller responds to a power control command received from a paging network to adjust the power level of the transmitter for subsequent transmissions. The power control command sets a power level of a subscriber units's transmissions to ensure that a subscriber units apparatus's successful transmission to a base station, while decreasing the such transmission's interference with other subscriber units' transmissions.

The above discussion has been in terms of pager systems, but the invention applies the same principle to cellular communications in general. For example, the present invention could be adapted for use with multiple stationary subscriber units that transmit large amounts of data on a reverse channel to paging network. A further understanding of the nature and advantages of the invention herein may be realized by reference to the remaining portions of the specification and the attached drawings.

DESCRIPTION OF THE PREFERRED EMBODIMENT

Figure 1:
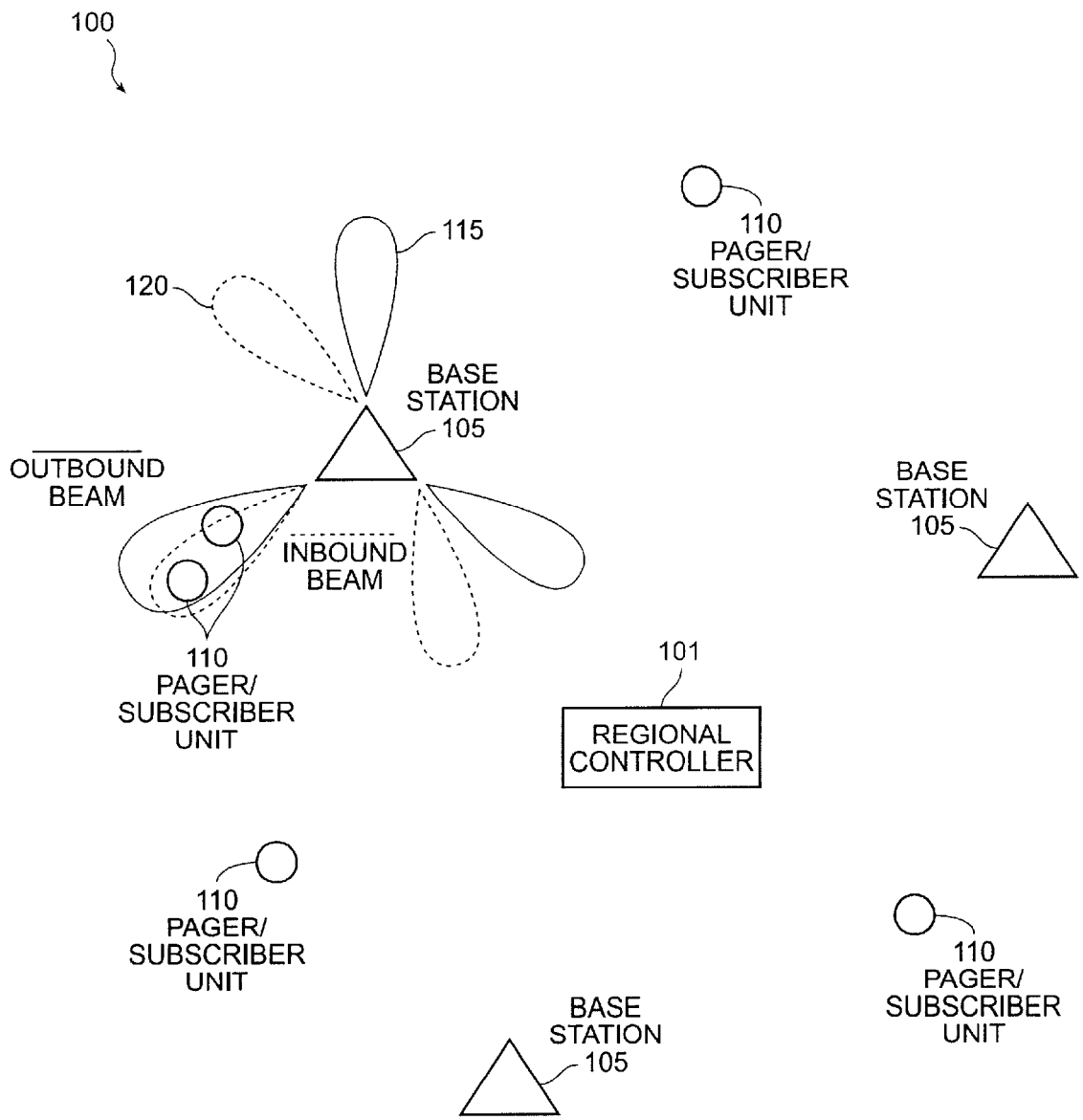
FIG. 1 depicts a two-way paging network including a regional controller, a plurality of base stations and a plurality of subscriber units, for use with the present invention.
Figure 2A:
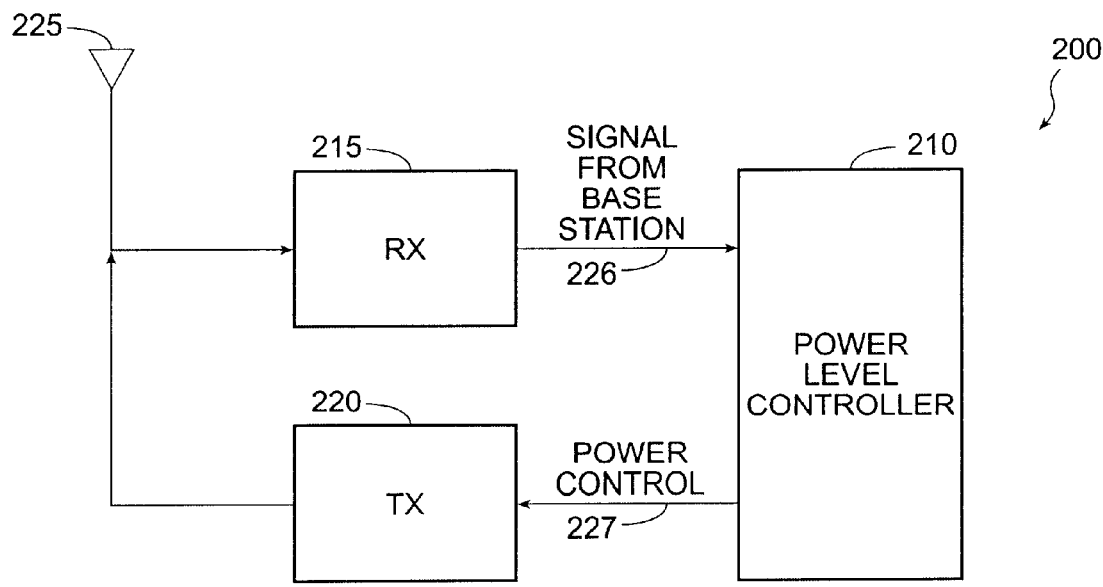
FIG. 2(a) depicts a two-way subscriber unit according to the present invention.

FIG. 2(a) depicts a subscriber unit (SU) apparatus 200 according to the present invention. Subscriber unit 200 includes an antenna 225 and a receiver 215 for receiving signals from a paging network, such as from a base station 105 in FIG. 1. Subscriber unit 200 also includes a transmitter 220 for sending data back to the paging network 100 in which it resides, such as responses to the base station 105 from which it receives messages. Subscriber unit 200 also contains a power level controller 210, which controls the transmission power level of transmitter 220.

Power level controller 210 receives a signal from the paging network 100 containing a unique power level command message 226. The signal is received at receiver 215 and sent to the power level controller 210, which processes the signal and the power level command message 226. The outcome of the power level controller's is a power control signal 227 which influences the power level of transmitter 220. In response to signals received from the paging network 100, the transmission power level of SU apparatus 210 may be controlled to avoid excessive levels of transmission power and reduce interference with other SUs.

Figure 2B:
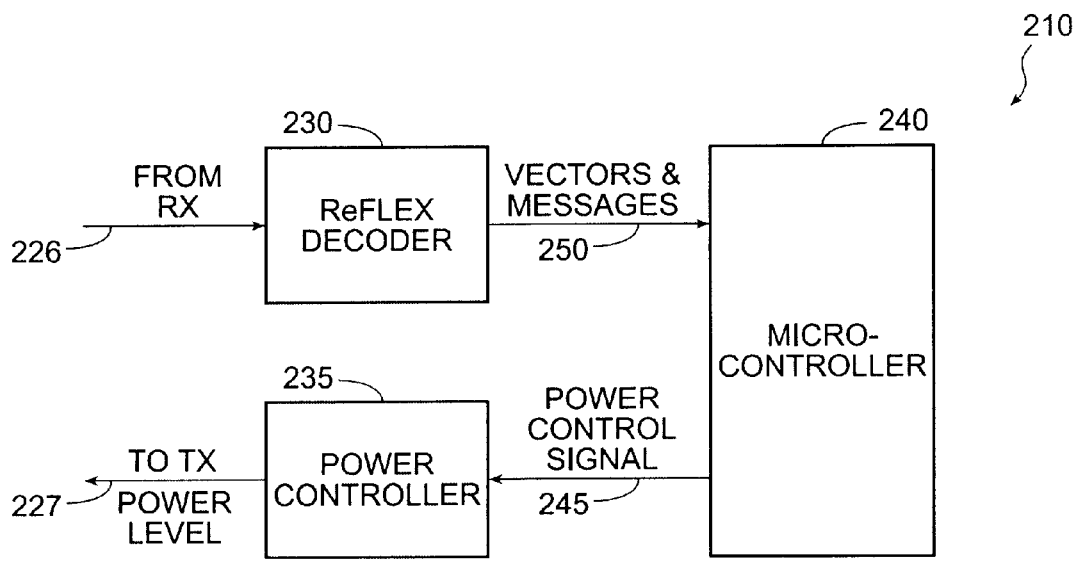
FIG. 2(b) depicts a power level controller system in a two-way subscriber unit in accordance with the present invention.

FIG. 2(b) depicts a more detailed view of power level controller 210, according to another aspect of the present invention. A protocol specifies the interaction between SU apparatus 200 and paging network 100. The preferred embodiment uses the ReFLEX protocol but other interactive protocols for use in two-way cellular communications may be suitably employed. The signal 226 received from the paging network 100 is first sent to a ReFLEX decoder 230 where the signal 226 is decoded. Decoded signal 226 includes vectors and messages 250 which are sent to a microcontroller 240. Microcontroller 240 may be any type of computer processor device operable according to the algorithmic flowcharts described below.

Microcontroller 240 receives the decoded signal 250 from ReFLEX decoder 230 and processes it. Power control signal 245 is extracted from decoded signal 250 by microcontroller 240 and sent to power controller 235. The power controller 235 adjusts a power level signal 227 sent to the transmitter 220. In the preferred embodiment, transmitter 220 is supplied power by a battery, but any power storage supply may be employed. The power level signal 227 adjusts the power level at which transmitter 220 sends out data signals.

In communication sessions initiated by SU apparatus 200, the first transmission will be controlled to transmit at an initial power level. The initial power level is approximately midway between the maximum transmitter power level and the minimum transmitter power level, as measured in dBm. If in response to its initial transmission, the SU apparatus 200 does not receive an acknowledgement, it will retransmit the initial transmission at its maximum power level. Among all of the base stations 105 that receive the SU's initial transmission, the regional controller 101 will select the base station having a high enough signal to noise ratio of the received transmission. Communication sessions using a specific two-way protocol are described below.

Figure 3:
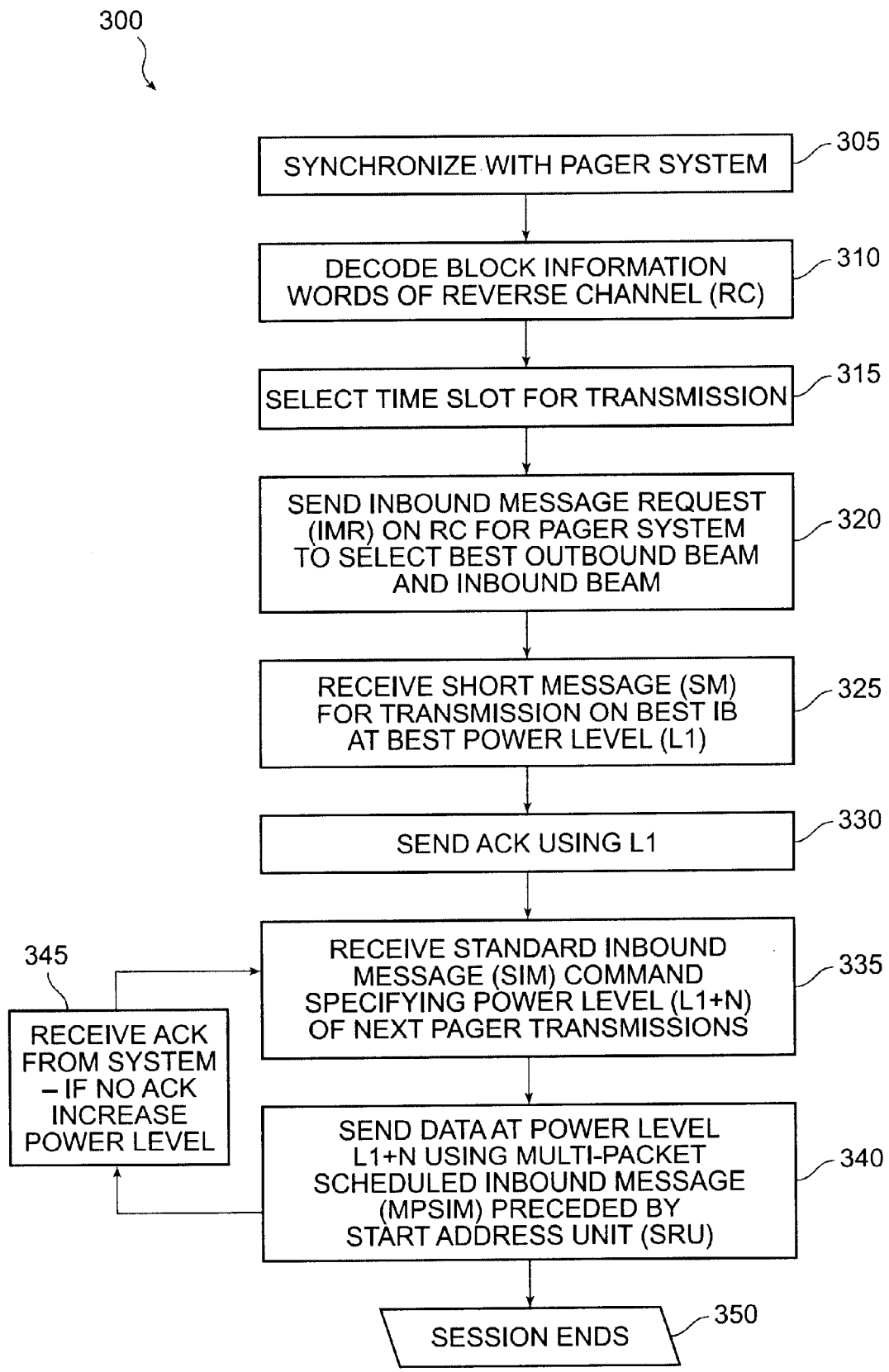
FIG. 3 depicts a flowchart describing steps of operating a subscriber unit network in accordance with one embodiment of the present invention.

FIG. 3 depicts a flowchart 300 describing further steps of operating a paging network in accordance with one embodiment of the present invention. Flowchart 300 describes a ReFLEX communication session initiated by a SU 110 in paging network 100. At step 305, SU 110 is synchronized in time and frequency with the paging network 100. Specifically, SU 110 synchronizes its receiver/transmitter to a selected base station 105 within the paging network 100.

At step 310, the SU 110 wishes to send data on the reverse channel. To accomplish this, SU 110 receives and decodes Block Information Words (BIW) sent by base station 105. The SU 110 uses the BIWs to select a time slot for transmission at step 315 by updating channel and time-slot parameters in its internal processor. At step 320, SU 110 sends an Inbound Message Request (IMR) on the reverse channel 120. The paging network 100 will select for the SU 110 the optimal outbound beam 115 and inbound beam 120 at the base station 105 for subsequent communication, as shown in the following steps.

At step 325 SU 110 receives a Short Message (SM) from the paging network 100. The SM uses a "numeric characters" option and data bits which can only be interpreted by SUs having power control capability of the present invention. The SM contains a custom data structure called the power level command, instructing the SU 110 to transmit at a power level desired by the paging network 100. The desired transmission power level is set so as to guarantee reception at the base station 105, yet takes account of possible interference of other SU communications. At step 330, the SU 105 responds to the SM by transmitting to the base station a standard acknowledgment (ACK) at the power level specified in the SM.

At step 335, the SU 110 receives a Standard Inbound Message (SIM) command, which also includes a power level command. The SIM received at step 335 tells the SU 105 when and how to send its data, and specifies a power level at which to transmit. The specified power level from the SIM may be higher if necessary. In response to the SIM, at step 340 SU 110 sends its data at the transmission power level specified by the SIM. Data is sent on Multi-Packet Scheduled Inbound (MPSI) messages, preceded by a Start Address Unit (SAU). After each packet or groups of packets sent by the SU 110 at step 340, the SU expects an ACK from the base station 105. If there is no ACK, the SU will retransmit at an incremental higher power level. Included in an ACK from the base station 105 can be another SIM specifying the same power level or a higher power level. Steps 335, 340 and 345 are repeated until the session ends.

Figure 4:
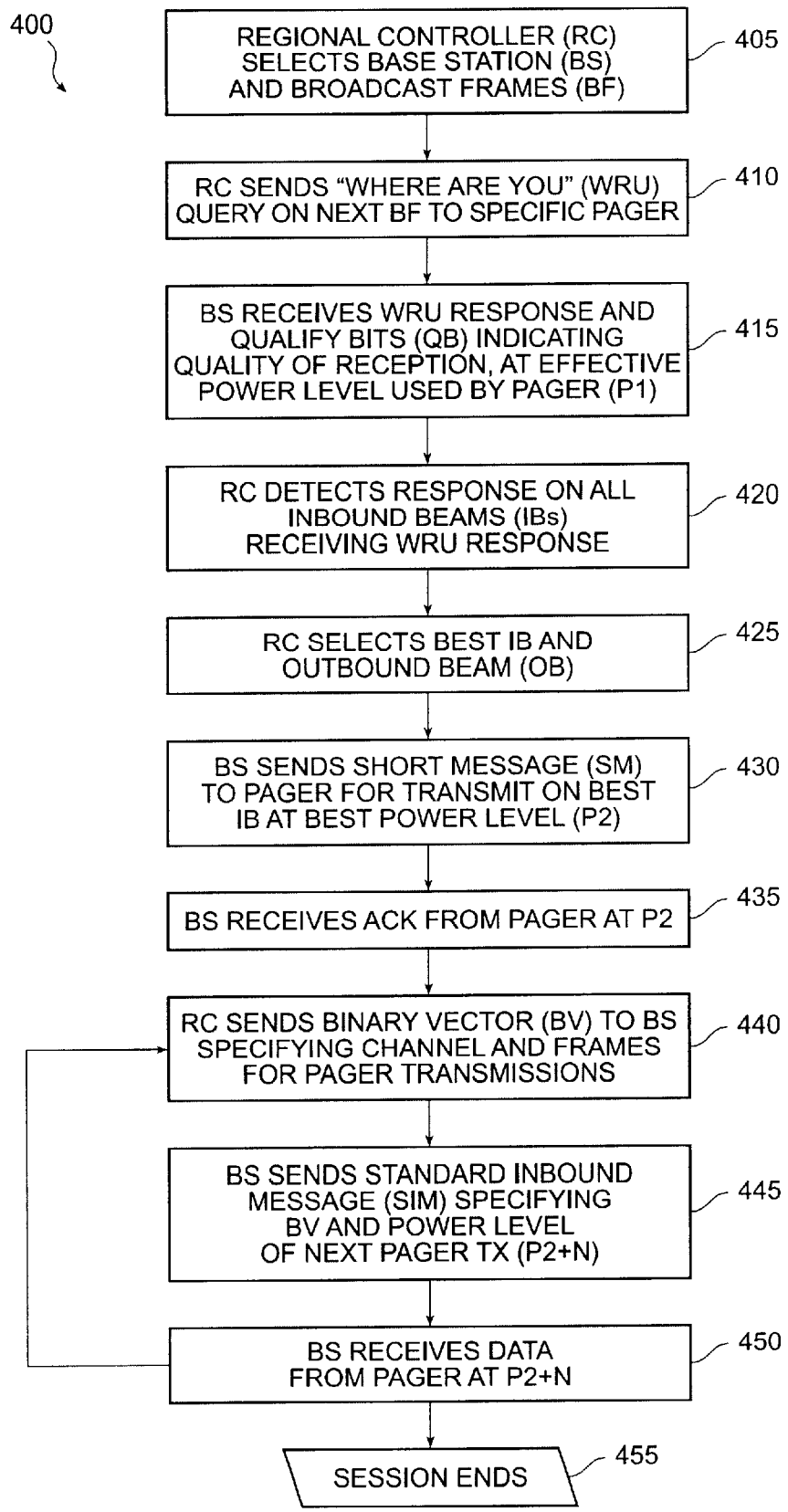
FIG. 4 depicts a flowchart describing steps of operating a subscriber unit network in accordance with an alternative embodiment of the present invention.

FIG. 4 depicts a flowchart 400 describing still further steps of operating a paging network in accordance with the present invention. Flowchart 400 describes a ReFLEX communication session initiated by the paging network 100, and specifically a base station 105 within the paging network 100. At step 405, the regional controller 101 in the paging network 100 selects a base station 105 and broadcast frames (BFs) for broadcast messages and initiation signals. It is assumed that the targeted SU 110 is already synchronized with the paging network in time and frequency.

Wishing to send a data message to a particular, selected SU 110, at step 410 the regional controller 101 sends a "Where aRe yoU" (WRU) query on the next BF. The WRU query instructs the SU's 110 how to respond by containing signals indicating a specific channel, frame and time slot. At step 415, the SU 110 responds to the WRU and reports to the regional controller with a message containing "quality bits" to report the quality of the WRU the SU received. The base station 105 receives the WRU response. Detecting the base station's receipt of the WRU response at step 420, the regional controller selects the best inbound beam 120 and outbound beam 115 from the inbound beams at base station 105 which received the WRU response.

At step 430, the base station 105 sends a SM to the SU 110 indicating a desired power level on which to transmit. At step 435, the base station 105 receives an ACK from the SU 110, sent at the transmission power level specified in the SM. After step 435, the communication session can progress according to steps 335–350 in FIG. 3.

Alternatively, the regional controller at step 440 may send a Binary Vector (BV) to the SU 110 specifying to the SU the channels and frames on which the paging network expects the SU's data, and when to send the MPSI messages. The BV specifies channel, frame, and slot for subsequent SU communications. At step 445 the base station 105 sends a SIM to the SU, specifying if needed a new power level for SU transmissions. The SU responds at step 450 by sending data at the power level designated in the SIM. Steps 440 through 450 are repeated until the communication session ends.

In the foregoing specification, the invention has been described with reference to specific exemplary embodiments thereof. It will, however, be evident that various modifications and changes may be made thereunto without departing from the broader spirit and scope of the invention as set forth in the appended claims and their full scope of equivalents.

What is claimed is:

1. In a subscriber unit communicating to a two-way paging network, a method for controlling said subscriber unit's transmission power level during a subscriber unit-initiated communication session using a standard ReFLEX protocol comprising steps of:

(1) synchronizing said subscriber unit with said paging network;

(2) receiving block information words from said paging network;

(3) decoding said block information words to select a time slot for transmission to said paging network;

(4) sending to said paging network an inbound message request to select an inbound receive beam and outbound transmission beam at said paging network for communication;

(5) receiving a short message from said paging network, said short message including a power level command specifying a first power level at which to transmit;

(6) transmitting an acknowledgment message using said first power level;

(7) receiving a standard inbound message, said inbound message including a power level command specifying a second power level at which to transmit subsequent transmissions;

(8) responding to said standard inbound message by transmitting data at said second power level; and (9) repeating steps (7) and (8) until said session ends.

2. The method of claim 1 wherein said paging network includes a plurality of base stations, and said step of communication session takes place with a selected one of said plurality of base stations.

3. The method of claim 1 wherein said paging network is comprised of a plurality of base stations and a regional controller.

4. In a two-way paging system comprised of a base station having a plurality of inbound receiving beams and a plurality of outbound transmission beams, a subscriber unit, and a regional controller, a method for controlling subscriber unit transmission power levels from a base station during a communication session initiated by said base station using a standard ReFLEX protocol comprising the steps of:

(1) receiving from said regional controller a query for said subscriber unit;

(2) sending to said subscriber unit said received query;

(3) receiving, in response to said query, a response from said subscriber unit, said response including data to indicate reception quality and transmitted by said subscriber unit at a first predetermined power level;

(4) sending to said regional controller a signal to indicate which of said plurality of inbound beams received said response;

(5) receiving from said regional controller a control message selecting one of said inbound beams on which subsequent communication will take place;

(6) sending to said subscriber unit a short message, said short message including a power level command specifying a second power level at which to transmit;

(7) receiving data transmitted by said subscriber unit at said second power level;

(8) repeating steps (6) through (7) until said session ends.

5. In a two-way paging system comprised of a base station having an omni-directional antenna, a plurality of subscriber units, and a regional controller, a method for controlling subscriber unit transmission power levels from a base station during a communication session initiated by said base station using a standard ReFLEX protocol comprising the steps of:

(1) receiving from said regional controller a query for said subscriber unit;

(2) sending to said subscriber unit said received query;

(3) receiving, in response to said query, a response from said subscriber unit, said response including data to indicate reception quality and transmitted by said subscriber unit at a first predetermined power level;

(4) sending to said subscriber unit a short message, said short message including a power level command specifying a second power level at which to transmit;

(5) receiving data transmitted by said subscriber unit at said second power level;

(6) repeating steps (4) through (6) until said session ends.

6. In a two-way paging system, a method for controlling subscriber unit transmission power for subscriber unit-initiated communication sessions comprising steps of:

sending from a subscriber unit an initial communication to a plurality of base stations at a predetermined initial power level, wherein said predetermined initial power level is approximately midway between said subscriber unit's minimum power and maximum power in dBm;

selecting one of said plurality of base stations receiving said initial communication and having a suitable signal to noise ratio to continue communication with said subscriber unit;

receiving at said subscriber unit, in response to said initial communication, an acknowledgment from said selected one of said plurality of base stations, wherein said acknowledgment includes a power command;

selecting a power level at said subscriber unit in response to said selected power command; and transmitting a plurality of messages to the selected base station at said selected power level.

7. In a two-way paging network, a method for controlling subscriber unit transmission power level during a subscriber unit-initiated communication session using a standard ReFlex protocol comprising the steps of:

sending to said paging network an inbound message request to select an inbound receive beam and outbound transmission beam at said paging network for communication;

transmitting an acknowledgment message using a first power level as defined by a received power level command; and receiving a standard inbound message including a power level command specifying a second power level at which to transmit subsequent transmissions.

8. In a two-way paging system having a base station providing a plurality of inbound receiving beams and a plurality of outbound transmission beams, at least one subscriber unit, and a regional controller, a method for controlling subscriber unit transmission power levels from a base station during a communication session initiated by the base station using a standard ReFlex protocol, said method comprising the steps of:

receiving, in response to query from the regional controller for the subscriber unit, a response from the subscriber unit including data to indicate reception quality and transmitted by the subscriber unit at a first predetermined power level; and sending to the subscriber unit a short message including a power level command specifying a second power level at which to transmit.

9. In a two-way paging system having a base station with an omni-directional antenna, a plurality of subscriber units and a regional controller, a method for controlling subscriber unit transmission power levels from the base station during a communication session initiated by said base station using a standard ReFlex protocol, said method comprising the steps of:

receiving, in response to a query from the regional controller for a subscriber unit, a response from the subscriber unit including data to indicate reception quality and transmitted by the subscriber unit at a first predetermined power level; and sending to the subscriber unit a short message including a power level command specifying a second power level at which to transmit.

* * * * *